(12) United States Patent
Rapp

(10) Patent No.: US 6,722,013 B1
(45) Date of Patent: Apr. 20, 2004

(54) METHOD, TOOL AND PUNCH FOR JOINING COMPONENTS TO A PLATE

(75) Inventor: Eugen Rapp, Berg (DE)

(73) Assignee: TOX Pressotechnik GmbH, Weingarten (DE)

(*) Notice: Subject to any disclaimer, the term of this patent is extended or adjusted under 35 U.S.C. 154(b) by 0 days.

(21) Appl. No.: 09/646,621
(22) PCT Filed: Mar. 25, 1999
(86) PCT No.: PCT/DE99/00904
§ 371 (c)(1),
(2), (4) Date: Sep. 20, 2000
(87) PCT Pub. No.: WO99/49227
PCT Pub. Date: Sep. 30, 1999

(30) Foreign Application Priority Data

Mar. 25, 1998 (DE) .......................... 198 13 007

(51) Int. Cl.⁷ .............................. B21D 39/00
(52) U.S. Cl. .................. 29/521; 29/505; 29/283.5; 29/525.08; 411/499; 411/492
(58) Field of Search .................. 29/505, 509, 432, 29/432.1, 432.2, 798, 243.5, 243.517, 243.53, 521, 283.5, 525.01, 525.08; 411/107, 180, 492, 499

(56) References Cited

U.S. PATENT DOCUMENTS

| | | | |
|---|---|---|---|
| 4,130,922 A | 12/1978 | Koett | |
| 4,193,333 A * | 3/1980 | Hallock | 411/176 |
| 4,459,073 A | 7/1984 | Muller | |
| 4,760,634 A | 8/1988 | Rapp | |
| 5,199,837 A * | 4/1993 | Goss | 411/107 |
| 5,528,812 A * | 6/1996 | Muller | 29/432.2 |
| 5,752,305 A * | 5/1998 | Cotterill et al. | 29/432.2 |
| 6,108,893 A * | 8/2000 | Wojciechowski et al. | 29/505 |
| 6,146,072 A * | 11/2000 | Muller | 411/176 |
| 6,338,601 B1 * | 1/2002 | Mauer et al. | 411/503 |
| 6,385,843 B1 * | 5/2002 | Singh et al. | 29/798 |
| 6,418,609 B1 * | 7/2002 | Wojciechowski et al. | 29/432.1 |

FOREIGN PATENT DOCUMENTS

| | | |
|---|---|---|
| DE | 30 03 908 | 8/1981 |
| DE | 43 33 052 | 3/1995 |
| DE | 44 04 659 | 8/1995 |
| DE | 44 19 065 | 12/1995 |
| DE | 197 00 627 | 7/1997 |
| DE | 197 26 457 | 1/1998 |
| DE | 197 01 150 | 7/1998 |
| WO | WO 93 109 25 | 6/1993 |

* cited by examiner

Primary Examiner—David P. Bryant
(74) Attorney, Agent, or Firm—Paul Vincent

(57) ABSTRACT

The invention relates to a method, a tool and a punch (1) for joining a sunken punch to one or more metal plates (2, 3). According to said method, in a single step, the plate or plates are deep-drawn into a deep-draw opening (5) of a female mould or then possibly crushed so that the displaced material fixes and joins the punch (1) to the plate or plates in a positive fit. The punch (1) may present further possibilities for engagement for creating a connection to other components.

11 Claims, 2 Drawing Sheets

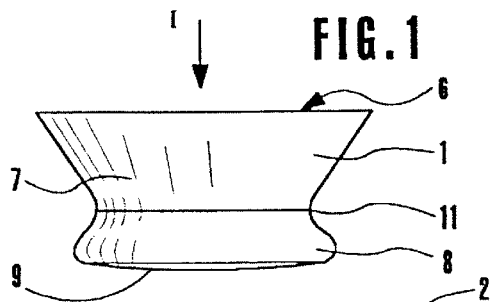
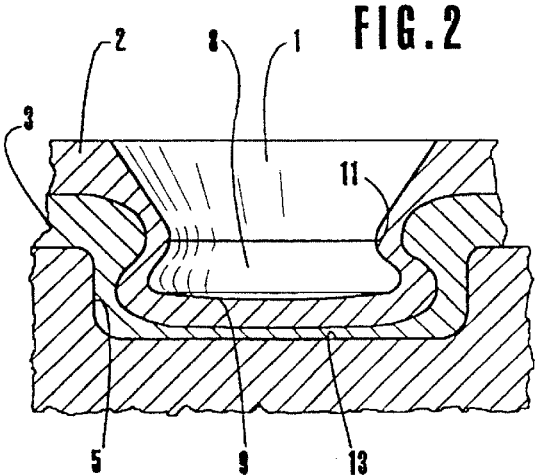
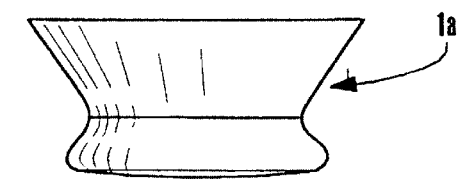
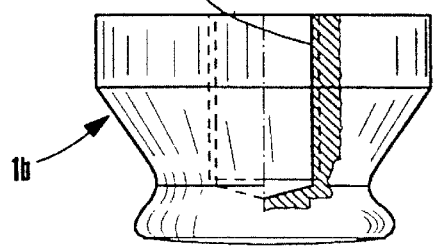
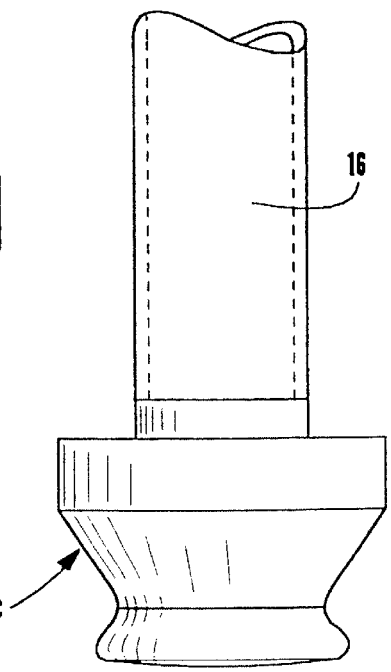

METHOD, TOOL AND PUNCH FOR JOINING COMPONENTS TO A PLATE

BACKGROUND OF THE INVENTION

The invention concerns a method, a pressing tool, and a punch, a pressing tool according to the categorizing portion of claim 4, and a punch according to the categorizing portion of claim 11. Connecting structural parts to a plate in accordance with this type of method involves non-detachable mounting of additional structural parts to a plate consisting preferably of relatively thin sheet metal, but even of plastic material or other deformable and crushable materials. The structural parts may be elements projecting from the plane of the sheet metal, such as nuts, threaded bolts, hook couplings and the like, or other plates which are to be connected to said plate. An important element of this connection is the "sunken punch" which remains in the plate after connection as a sort of riveting work piece.

In a known method, tool, or punch (DE-Patent 30 03 908 U.S. Pat. No. 4,459,073), a stud bolt comprising both a thread and a punch is pressed, using a punching and riveting procedure, with the punch into a plate, wherein surface parts are punched through an opening of a female mould located opposite to the punch, and the edge areas of the punch openings are displaced. The punch is hollow and its cutting edge punches a corresponding plate part, while surface parts of the plate located outside of this punching-out area are flanged by the female mould. An opposing punch is disposed in the female mould, comprising a central spreading body through which the cutting ring of the punch is forced apart, i.e. widened in a further step thereby engaging behind the collar of the deep-drawn hole of the plate. Irrespective of the fact that the required female mould tool, comprising a spreading body, is technically demanding and is subjected to considerable wear, there is the disadvantage that the punch must consist of relatively soft material to be widened after punching the plate, and to subsequently be able to flow, in the female mould opening, below the deep-drawn edge. In accordance with the punch part, the threaded bolt part of this stud bolt is also of relatively soft material with all associated disadvantages. One main disadvantage is that, to effect mounting, the plate has to be penetrated thereby not only resulting in loss of rigidity but also generating non-sealed locations. The punch material must have a minimum rigidity in order to carry out the punching process which is contradictory to the material softness required for forming.

Another conventional method and tool categorizing the invention (WO 93/10925 A) comprise a sunken punch having a inwardly directed bulge at its side facing the plate, the bulge forming a cutting edge to effect flow of the sunken punch during the deep drawing process. The material constituting the sunken punch is sufficiently soft that the plate is not broken through. Depending on material hardness, a connection point of this kind is relatively malleable such that only unsatisfactory fulfillment of a major advantage of the sunken punch—namely, prevention of a press—button character of such a connection point—is effected.

SUMMARY OF THE INVENTION

In contrast thereto, the method, pressing device or punch in accordance with the invention having the features of the independent claims have the advantage that a highly rigid connection between plate and structural parts is produced with neither leakage nor weaknesses due to openings in a plate. Through deep-drawing, the plate material is sectionally thinned and moved in the deep-drawing direction in response to approximately 20% of the overall necessary force. The remaining 80% is increasingly required for the subsequent crushing process between the end face of the punch and bottom of the female mould opening, wherein the deep-drawn material first flows in a radially outward direction and then, due to the unyielding walls of the female mould opening, towards the punch thereby surrounding same in a form-fitting, rivet-like manner. Deformation of the punch is possible at the end of this crushing process due to the associated larger applied forces. All this is carried out in only one step. It is decisive that the punch serves as deep-drawing tool and also as "sunken, lost, or dead rivet". In order to ensure uniform quality, the material of the punch must be significantly harder than the plate material such that either only the plate material flows while the punch shape remains unchanged, or that the flowing process starts only near the end of the crushing process when the forces are large. In any case, a uniform quality is guaranteed for the individual connecting points produced according to the method.

The pressing device in accordance with the invention most advantageously elevates the edge region of the bottom of the deep draw opening. In contrast thereto, conventional pressing devices (DE Publication 4404 659) have a deep-drawing opening whose bottom has a peripheral depression. Material is thereby pushed into this depression during the pressing procedure thereby producing a push-button-like hook engagement with corresponding material accumulation serving to strengthen the hook engagement. In contrast thereto and in accordance with the invention, the peripheral elevation causes material to be displaced precisely in this area from the bottom of the deep-drawn, flat parts of the plate in a radial direction about the punch towards the top, thereby improving the hook engagement, and most importantly, effecting a rigid form-fit connection to the sunken punch which, in accordance with the invention, remains in the penetration opening.

In accordance with a further advantageous embodiment of the inventive method (per se known through DE Publication 35 32 900) the female mould is pot shaped and has a non-changing opening volume in the pressing direction and transverse thereto, to unyieldingly restrict the crushing process of the displaced material in the longitudinal and transverse directions. Appropriate design of the female mould opening to effect favorable material flow can thus achieve particularly high rigidity for the connection. In a method categorizing the invention (WO 93/10925 A), the female mould has flexible walls forming a collar and only the bottom of the mould is inflexible. The flexibility of the walls substantially influences the quality of the connection point, since insufficient flow of plate material occurs. However, the female mould can be fashioned in various ways; in further variations, e.g. having rigid cylindrical side walls or in the form of a pot having an adjustable bottom.

In an advantageous embodiment of the pressing device in accordance with the invention, the deep draw opening is a cylindrical bottom hole or tapers slightly in the pressing direction, with non-yielding side walls.

In accordance with an additional advantageous embodiment of the invention a sunken punch is provided which is part of the pressing plunger and is disposed between the plunger and the plate for deep-drawing the plate into the deep draw opening of the female mould for integration at this location.

In accordance with a further associated embodiment of the invention, the peripheral elevation has the same or a larger inner diameter than the punch diameter thereby preventing production of a bottle neck between the upper side of the elevation and the lower side of the punch which would impair material flow.

In accordance with a further advantageous embodiment of the invention, the press plunger comprises a central blind bore in its end for guiding the sunken punch. Such a central blind bore is known per se (DE Patent 30 03 908), wherein during fitting of the sunken punch, the press plunger can be supported on a shoulder or end face of the punch and a threaded bolt or the like can project into the blind bore.

In accordance with a further advantageous embodiment of the invention, the press plunger is guided in a clamping member which comprises supply openings for the sunken punch (per se known: DE Publication 44 04 659) to load a further sunken punch during the return stroke and before a renewed pressing stroke in preparation for a new connection point. This clamping member can simultaneously clamp the plate on the female mould before pressing the press plunger and punch into the plate surface. Automatic loading of the tool for the sunken punch can be effected via such a supply opening.

In accordance with a further advantageous embodiment of the invention, the plunger stroke is limited such that separation of the plate is avoided and the deep-drawn planar parts are still crushed. Such stroke definition is no problem for a pressing tool.

In accordance with an embodiment, the punch in accordance with the invention comprises one radial recess into which material can be displaced and engage during crushing, which can be formed as an annular groove or peripheral recess.

In accordance with a further embodiment of the invention of this type, two parallel annular grooves are provided in the punch having a minimum separation to avoid its breaking during crushing. In particular the high pressure required for the crushing process generates separating forces within the annular groove due to the displaced plate material which could lead to tearing off. The resulting "breaking point" is matched to the punch material and to the female mould shape, wherein the annular grooves may also be omitted in the blank to achieve such a "breaking point".

In accordance with a further embodiment of the invention of this type, the transitions on the radial surface area and/or on the end face of the punch facing the pressing direction are rounded. Such rounding of the transitions improves flow of the displaced, crushed material.

In accordance with a further advantageous embodiment of the invention, the punch serves as connecting means with other structural parts and is provided with a corresponding connection engagement means. Such an engagement means may be either a pin projecting beyond the plate after installation on which an outer thread, an engaging annular groove or the like may be disposed, or a threaded bore, hook groove or the like on the punch or magnetic or other engagement means. In accordance with the invention, in addition to a connecting means comprising such an engagement possibility, further plates may also be connected to the plate as described above. It is decisive that the punch remains as a sunken tool in the pressing opening.

In accordance with a further advantageous embodiment of the invention, the radial surface area of the punch is formed as a rotation-preventing prism such that the displaced material prevents rotation of the punch in the opening receiving same.

An embodiment of the inventive method and of the punch is shown in a highly simplified manner in the drawing and further explained below.

BRIEF DESCRIPTION OF THE DRAWING

FIG. 1 shows the work piece and tool before production of the connection;

FIG. 2 shows the work piece and tool after production of the connection;

FIG. 3 shows a first variation of a sunken punch;

FIG. 4 shows a second variation of a sunken punch;

FIG. 5 shows a third variation of a sunken punch;

DESCRIPTION OF THE PREFERRED EMBODIMENT

Figure 6:
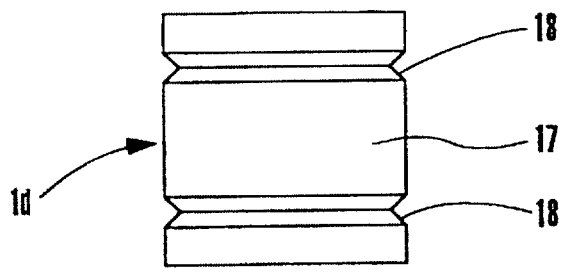
FIG. 6 shows a fourth variation of a sunken punch.

FIG. 1 shows an inventive sunken punch 1 above two superposed metal plates 2 and 3 which, in turn, are disposed on a female mould 4 which has a deep-drawing opening 5 facing the metal plates. The punch 1 is normally displaceably disposed in a guiding part (not shown) in the direction of the arrow I and is driven in the direction of the metal plates 2, 3 via a press plunger (also not shown). The punch 1 has an end face 6 and a penetration section 7 which widens towards the end face 6 and, on the other side, terminates in a head 8 having a bottom 9. There is a taper 11 between the penetration section 7 and the head 8.

The deep-drawing opening 5 of the female mould 4 has cylindrical side walls 12 and a flat bottom 13. A peripheral elevation 14 may be provided between the side walls 12 and the bottom 13.

FIG. 2 shows the punch 1 in its final position. The sunken punch assumes this final position after effecting two functions of the inventive connection method in one step, namely firstly, deep-drawing of flat parts of the plates 2 and 3 into the deep-drawing opening 5, and secondly, displacement of the material located between its bottom side 9 and the bottom 13 of the deep-drawing opening 5 in a radially outward direction, wherein said material flows behind the head 8, i.e. into the taper 11 of the punch 1. The punch 1 is thus firmly held, thereby producing a positive-fit and frictional-fit connection. As soon as the connection has been produced it is removed from the deep-drawing opening 5.

Such an elevation 14 can improve material flow in the direction of the taper 11. After termination of the two method steps, the upper side of the punch is flush with the upper surface of the metal plate 2.

In accordance with the invention, instead of connecting the stamp, like a rivet, with two or more metal plates in the fashion described, the punch 1 may be connected to only one plate, wherein the method is effected basically in the same manner, with only one instead of two superposed plates being used. Also in this case, the first step is deep-drawing followed by crushing, wherein the crushed material also flows behind the head thereby generating a rigid connection of the sunken punch in the penetration opening of the plate. To optimize this procedure, the punch 1 is made from a harder material than the metal plate or plates such that neither the punch itself nor the deep-drawing opening 5 of the female mould 4 are deformed during the pressing process.

In accordance with the invention, the punch 1 may serve as connecting means for further structural parts, wherein its free end face may be provided with engagement means. In accordance with the invention, the punch may thereby connect several metal plates via the pressing method described or be disposed on only one plate with engagement means for connection to other structural parts.

FIG. 3 shows the punch 1a alone as it would be used e.g. as sunken rivet for connecting several plates, whereupon the penetration opening of the punch would be closed at the top.

FIG. 4 shows a partial section of the punch 1b having a central threaded bore 15, wherein other parts to be connected can be screwed to said threaded bore 15 as engagement means. Advantageously, such a threaded bore can penetrate relatively deeply into the punch such that unused punches of this type do not cause problems when installed.

FIG. 5 shows a punch 1c whose upper side has a threaded bolt 16 as engagement means to which further structural parts can be mounted.

FIG. 6 shows a punch 1d which is largely cylindrical and whose surface area 17 is provided with two annular grooves 18 into which the material displaced from the metal plates 2 and 3 during crushing is pressed, wherein the separation between the two annular grooves 18 has to be matched to the material and to the diameter. Thus, the punch, functioning as a rivet, spreads slightly less with smaller diameter than with larger diameter.

Figure 7:
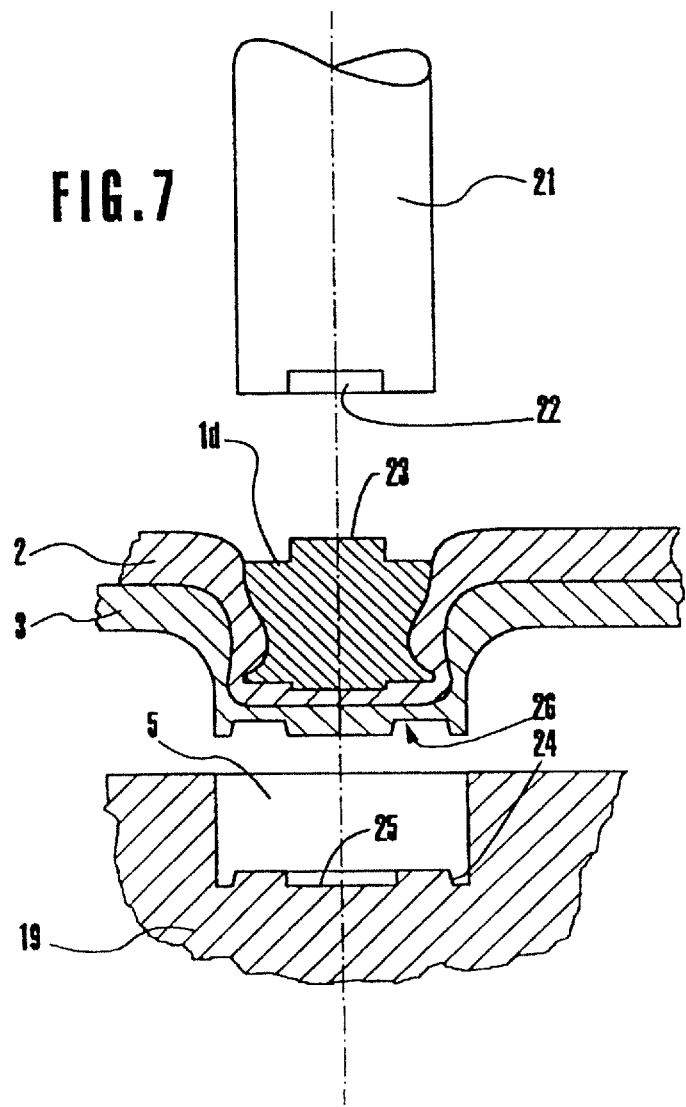
FIG. 7 shows tools and work pieces in a longitudinal section and in exploded view.

FIG. 7 shows, in a highly simplified manner, tool and work piece in a longitudinal section and exploded view. Each sunken punch 1d is inserted into the metal plates 2 and 3 between the female mould 19 and a press plunger 21. The press plunger 21 has a recess 22 on its side facing the punch 1d which would have produced an elevation 23 in the sunken punch. The female mould 19 has an annular groove 24 and a depression 25 in the bottom of its deep-drawing opening 5 which results in a corresponding pattern 26 on the lower side of the metal plate 3 in the area of the connection point. The configurations of the recess 22, of the annular groove 24 and the depression 25 are matched to the dimensions and the material in the area of this connecting point to achieve e.g. the rivet-like deformation shown.

| List of Reference Numerals: | |
| --- | --- |
| 1 | sunken punch |
| 1a, b, c, d | different punch variants |
| 2 | metal plate |
| 3 | metal plate |
| 4 | female mould |
| 5 | deep-drawing opening |
| 6 | end face |
| 7 | penetration section |
| 8 | head |
| 9 | bottom side |
| 10 | — |
| 11 | taper |
| 12 | side walls |
| 13 | floor |
| 14 | elevation |
| 15 | threaded bore |
| 16 | threaded bolt |
| 17 | surface area |
| 18 | annular grooves |
| 19 | female mould |
| 20 | — |
| 21 | press plunger |
| 22 | recess |
| 23 | elevation |
| 24 | annular groove |
| 25 | depression |
| 26 | design |
| 1 | pressing direction |

What is claimed is:

1. A device for connecting structural parts such as further plates, bolts and nuts to a plate, the device comprising:
   a sunken punch disposed on a first side of at least one plate, said sunken punch having an end face, a penetration section which widens towards said end face, a head having a bottom, and a taper disposed between said penetration section and said head, said bottom facing said first side of said at least one plate;
   a female mould disposed on a second side of said at least one plate opposite said first side, said female mould having smooth, vertical, cylindrical side walls and a flat, solid bottom; and
   means for deep drawing an area of said at least one plate into said female mould by pressing said bottom of said sunken punch in an axial direction against said first side of said at least one plate to displace and deform plate material by means of said bottom of said sunken punch, said side walls, and said bottom of said female mould, said displaced plate material crushed in an axial direction and displaced in a transverse direction to engage within and substantially fill said taper for fashioning a positive connection between said punch and said at least one plate, said punch being made from a material which is sufficiently harder than said plate material such that no punch material flows during deep drawing of said plate material with said punch and said mould being dimensioned such that, when said end face is substantially flush with said first side of said at least one plate, attachment between said sunken punch and said at least one plate is effected in one single step and without breaking through said at least one plate.

2. The device of claim 1, further comprising a peripheral elevation disposed between said bottom of said female mould and said side walls, said deep drawing means comprising a press plunger actuated in a direction towards said female mould.

3. The device of claim 2, wherein said peripheral elevation has a same or a larger inner diameter than a diameter of said punch.

4. The device of claim 2, wherein said press plunger has a central blind bore at an end thereof for guiding said sunken punch.

5. The device of claim 2, further comprising a clamping member guiding said press plunger, said clamping member having supply openings for said sunken punch to load a further sunken punch during a return stroke and before a renewed pressing stroke.

6. The device of claim 2, further comprising means for limiting a plunger stroke to prevent said sunken punch from breaking through said at least one plate during crushing of deep-drawn parts.

7. The device of claim 1, wherein said taper comprises at least one recess means about a girth of said punch into which said plate material is pressed and behind which said plate material engages when said punch is pressed in.

8. The device of claim 1, wherein said punch comprises smooth, rounded transitions on a radial surface area of said head adjacent to said bottom.

9. The device of claim 1, wherein said punch further comprises a pin projecting past said first side of said at least one plate following installation to serve as a connection element, said pin having one of a connection means, an outer thread, an engagement groove, and a bore having one of a thread and a hooking groove.

10. The device of claim 1, wherein said punch has a radial surface area designed as a rotation-preventing prism.

11. A method for connecting structural parts such as further plates, bolts and nuts to a plate, the method comprising the steps of:

a) disposing a sunken punch on a first side of at least one plate, said sunken punch having an end face, a penetration section which widens towards said end face, a head having a bottom, and a taper disposed between said penetration section and said head, said bottom facing said first side of said at least one plate;

b) disposing a female mould on a second side of said at least one plate opposite said first side, said female mould having smooth, vertical, cylindrical side walls and a flat, solid bottom; and c) deep drawing an area of said at least one plate into said female mould by pressing said bottom of said sunken punch in an axial direction against said first side of said at least one plate to displace and deform plate material by means of said bottom of said sunken punch, said side walls, and said bottom of said female mould, said displaced plate material crushed in an axial direction and displaced in a transverse direction to engage within and substantially fill said taper for fashioning a positive connection between said punch and said at least one plate, said punch being made from a material which is sufficiently harder than said plate material such that no punch material flows during deep drawing of said plate material, with said punch and said mould being dimensioned such that, when said end face is substantially flush with said first side of said at least one plate, attachment between said sunken punch and said at least one plate is effected in one single step and without breaking through said at least one plate.

\* \* \* \* \*